United States Patent [19]

Conger et al.

[11] 3,787,280

[45] Jan. 22, 1974

[54] RESINOUS PRODUCT HAVING SHARP COLOR DEFINITIONS THEREIN

[75] Inventors: Robert P. Conger, Park Ridge; Seevaram N. Varadhachary, North Plainfield, both of N.J.

[73] Assignee: Congoleum Industries, Inc., Kearny, N.J.

[22] Filed: Mar. 16, 1971

[21] Appl. No.: 124,930

[52] U.S. Cl.............. 161/168, 156/62.2, 161/5, 161/6, 161/256, 260/884, 264/73, 264/245
[51] Int. Cl............................. B32b 5/16, B44f 1/00
[58] Field of Search... 156/62.2; 161/5, 6, 168, 256; 260/884; 264/73, 75, 76, 77, 245

[56] References Cited
UNITED STATES PATENTS

| | | | |
|---|---|---|---|
| 3,095,400 | 6/1963 | Martino et al. | 260/43 |
| 3,557,256 | 1/1971 | Muskat | 260/884 |
| 2,798,258 | 7/1957 | Allan et al. | 264/75 |

*Primary Examiner*—Daniel J. Fritsch
*Assistant Examiner*—Robert A. Dawson
*Attorney, Agent, or Firm*—Richard T. Laughlin; Shlesinger, Arkwright, Garvey & Dinsmore

[57] ABSTRACT

A method of producing extruded resinous products from a blend of variously colored resinous granules which contain multifunctional monomers which have been crosslinked in the formation of the chips together with other chips having no cross-linking monomer present, and the product so produced.

14 Claims, No Drawings

RESINOUS PRODUCT HAVING SHARP COLOR DEFINITIONS THEREIN

This invention relates to the method of producing extruded shapes from blends or mixtures of variously colored resinous particles, and more particularly, a blend of particles containing multifunctional monomers which have been crosslinked in the formation of the granules together with granules having no crosslinking monomers present.

In the art of manufacturing surface coverings, particularly surface coverings which include a resinous wear layer on a suitable substrate, various methods have been devised for producing a decorative surface effect in the resinous wear layer. Among the effects produced in prior art teachings, are striations, mosaics, burnishings, polishes, variegations, wrinkles or the like. These effects are produced by either a treatment step on the wear layer after it has been laminated to the substrate, or by means of various additives to the resinous blend at the time of formation of the wear layer.

One of the prior art effects was to produce a mosaic-like appearance by extruding a blend of variously colored resinous chips of polyvinyl chloride, or other suitable resinous material. However, one of the disadvantages to this type of process in the prior art has been that the extrusion temperature of the resinous blend in the extruder barrel was so high as to partially melt the chips, and thus produce a fusion between the adjacent chips and a blurring of the colors between the chips. This blurring is undesirable in products where a clear definition of color is desirable.

Accordingly, it is a primary object of this invention to produce an extruded product or blend of variously colored resinous chips and having good color definition in the extruded product.

It is a further object of this invention to produce an extruded, pressed or calendered sheet product or the like from a blend of colored and clear chips.

Still another object of this invention is to provide a method for the maintenance of good color definition in an extruded product of various colors.

Yet a further object of this invention is to provide a method for the extrusion, pressing or calendering of a blend of particles containing multifunctional crosslinking monomers together with granules having no cross linked monomers.

Still a further object of this invention is to produce resinous products having very sharp color definitions in their marbleization or striations by the use of a compound containing a crosslinked network formed prior to or during its processing.

Still a further object of this invention is to provide a method of forming resinous products from a blend of colored particles and maintaining good color definition within the finished product.

These and other objects and advantages of this invention will become apparent when considered in light of the following description and claims.

In order to make a sheet of the material which has good sharp color definition from material including crosslinked monomers, it is important that there exists one phase having no cross-linked monomers present. It is believed that the crosslinked network when used in conjunction with a non-crosslinked network first, greatly increases the hot melt torque of the compound, and second, greatly slows down the migration of the pigment coloration so that there is very little or no smearing of the coloration.

In this manner, by way of example, the background color can be made with the compound containing no crosslinkable monomer while the chips containing the various colors which are to be striated or marbleized would contain the crosslinked network.

The sheets from which the multicolored chips are produced, are characterized by having one or more pigmented granules containing multifunctional monomers which have been crosslinked in the formation of the granule, and a clear or pigmented granule with no crosslinking monomer present. It is also possible to utilize the clear granule containing the crosslinking monomer and a different color clear or opaquely pigmented stock with no crosslinking monomer. Other combinations are also possible but it is important to have one phase which has no crosslinked monomer present so that it can flow readily.

The following are typical non-limiting examples illustrating various forms which this invention might take.

EXAMPLE 1

The following formulations were blended and milled to produce white and colored chips:

| A | Recipe | PHR (Parts per hundred parts of resin) |
|---|---|---|
| | poly vinyl chloride | 100 |
| | Dioctylphthalate | 20 |
| | Epoxidized Soybean Oil | 5 |
| | Barium, cadmium Stabilizer with phosphite | 3 |
| | organo-phosphite chelator | 1 |
| | pigment | as needed |

Subsequently the following mixture was added to A and then milled into a sheet.

| B | Recipe | PHR (Parts per hundred parts of resin) |
|---|---|---|
| | Trimethyolpropane Trimethacrylate | 15 |
| | Dicumyl peroxide (40%) on calcium carbonate | 1.87 |
| | Calcium Silicate filler | 0.5 |

The resultant sheet was pressed at 320°F for 5 minutes and then cooled. The pressed sheet (A + B formulation) was subsequently cut into small pieces and blended with chips of other colors containing no crosslinked network such as would be available using recipe A by itself. The mixture of chips was pressed at 340°F for 2 minutes and cooled. The resultant sheet provided a good definition between the colors. When all the chips were of A compound there was some smearing of colors. A mixture of chips, one with the crosslinked network and the other without, were extruded as a ribbon with sharp striations. The extrudate was pressed at 340°F for 1 minute to give a smooth surface. This pressed extrudate had a good color separation. On the other hand blend of chips without any cross-linked monomer produced smeared decoration.

EXAMPLE 2

Formula A plus recipe C below were processed in the same manner to produce chips.

| C | Recipe | PHR (Parts per hundred parts of resin) |
|---|---|---|
| | Pentaerythritol tetramethacrylate | 15.0 |
| | Dicumyl peroxide (40%) on calcium carbonate | 1.87 |

Use of chips from A + C, instead of from A + B also produced very good separation of colors. This example differs from example 1 in that a different monomer and no filler was used.

Thus it is seen that a blend of chips containing a crosslinked monomer with chips containing no crosslinkable monomer produces a striated or variously colored resinous product either by extrusion, calendering, or pressing with very good color separation and definition in the product.

While this invention has been described, it will be understood that it is capable of further modification, and this application is intended to cover any variations, used and/or adaptations of the invention following in general, the principle of the invention and including such departures from the present disclosure as come within known or customary practice in the art to which the invention pertains, and as may be applied to the essential features hereinbefore set forth, as fall within the scope of the invention or the limits of the appended claims.

What is claimed is:

1. A method for producing a resinous product from a plurality of variously colored resinous chips without smearing of colors of the chips, the method comprising:
   a. providing a quantity of thermoplastic synthetic resinous chips each of which consists essentially of a plasticized thermoplastic synthetic polymer in a network of cross-linked polymer formed from a multi-functional monomer,
   b. providing a quantity of plasticized thermoplastic synthetic resinous chips each of which is free of cross-linked monomers, combining said chips of steps (a) and (b) into a mixture of said chips, and
   c. heating said mixture and forming therefrom a sheet-like product having good separation of colors between the chips containing said cross-linked polymer and said chips free of cross-linked monomers.

2. A method as in claim 1 and including:
   a. forming said sheetlike product by extrusion.

3. A method as in claim 1 and including:
   a. forming said sheetlike product by calendering.

4. A method as in claim 1 and wherein:
   a. forming said sheetlike product by pressing.

5. A method as in claim 2 and wherein:
   a. said resinous granules comprising crosslinked multifunctional monomers include vinyl monomers crosslinked with acrylic monomers.

6. A method as in claim 5 and wherein:
   a. said crosslinked granules are colored.

7. A method as in claim 5 and wherein:
   a. said resinous granules free of crosslinked monomers are colored.

8. A resinous sheet-like product formed from a quantity of variously colored synthetic resinous chips, said product exhibiting good color separation between certain adjacent chips and comprising:
   a. a quantity of thermoplastic synthetic resinous chips each of which consists essentially of a plasticized thermoplastic synthetic polymer in a network of cross-linked polymer formed from a multi-functional monomer,
   b. a quantity of plasticized thermoplastic synthetic resinous chips each of which is free of cross-linked monomers,
   c. said chips containing said cross-linked polymer and said chips free of cross-linked monomers being substantially evenly distributed in said product and having a distinct color separation therebetween.

9. A resinous sheetlike product as in claim 8 and wherein:
   a. said first resinous network comprises vinyl monomers crosslinked with acrylic monomers.

10. A resinous sheetlike product as in claim 9 and wherein:
    a. said second resinous network comprises a vinyl resin.

11. A resinous sheetlike product as in claim 10 and wherein:
    a. said first resinous network includes pigmentation.

12. A resinous sheetlike product as in claim 10 and wherein:
    a. said second resinous network includes pigmentation.

13. A resinous sheetlike product as in claim 10 and wherein:
    a. each of said first and second resinous networks include pigmentation.

14. A resinous sheetlike product as in claim 10 and wherein:
    a. said first resinous network includes approximately 100 parts of a polyvinyl halide, approximately 15 parts trimethylolpropanetrimethacrylate, a plasticizer, and a crosslinking agent.

* * * * *